Sept. 15, 1959 R. F. TABER 2,903,887
INSTRUMENT FOR TESTING PROPERTIES OF MATERIALS
Filed June 20, 1955 4 Sheets-Sheet 1
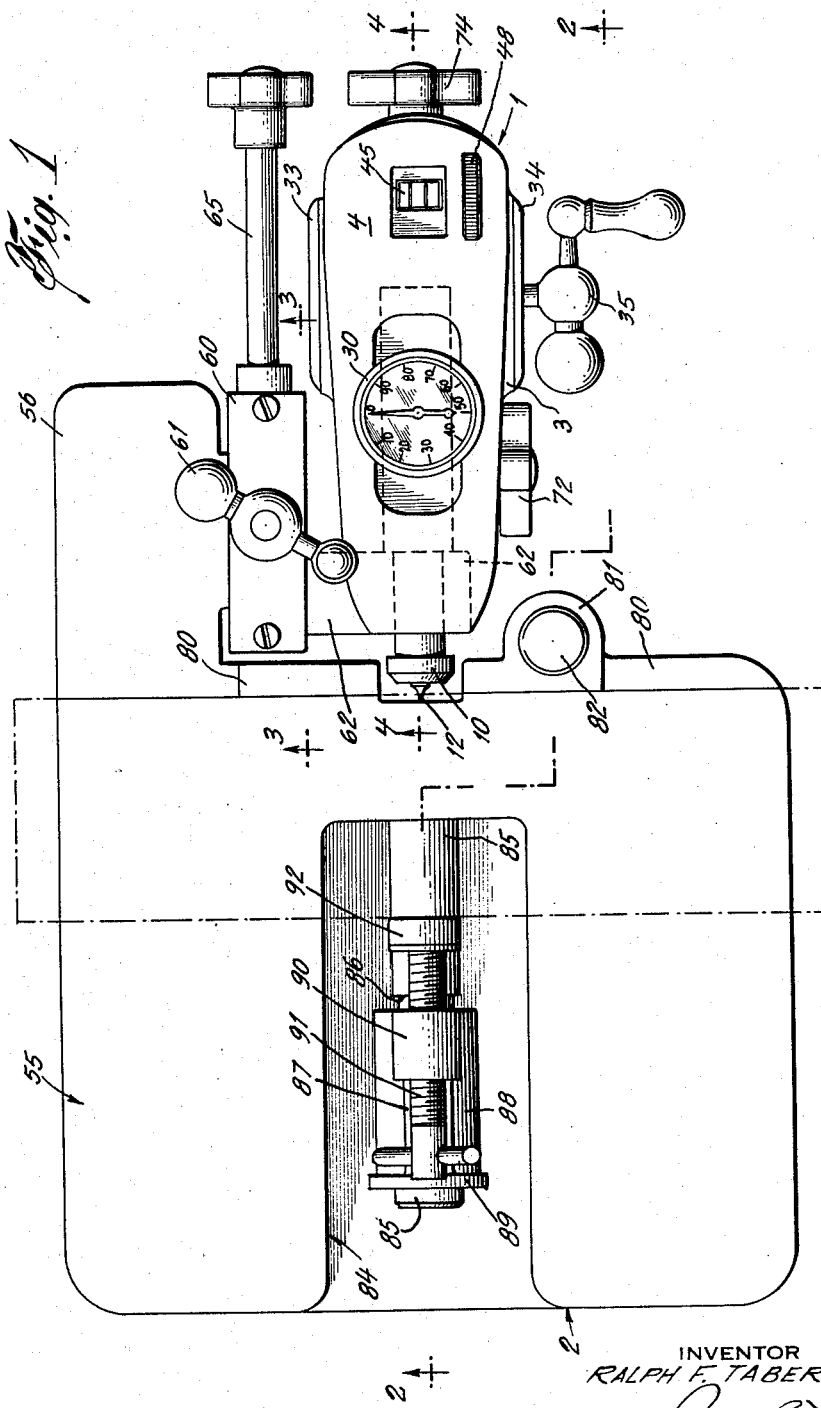
INVENTOR
RALPH F. TABER
BY 
ATTORNEY

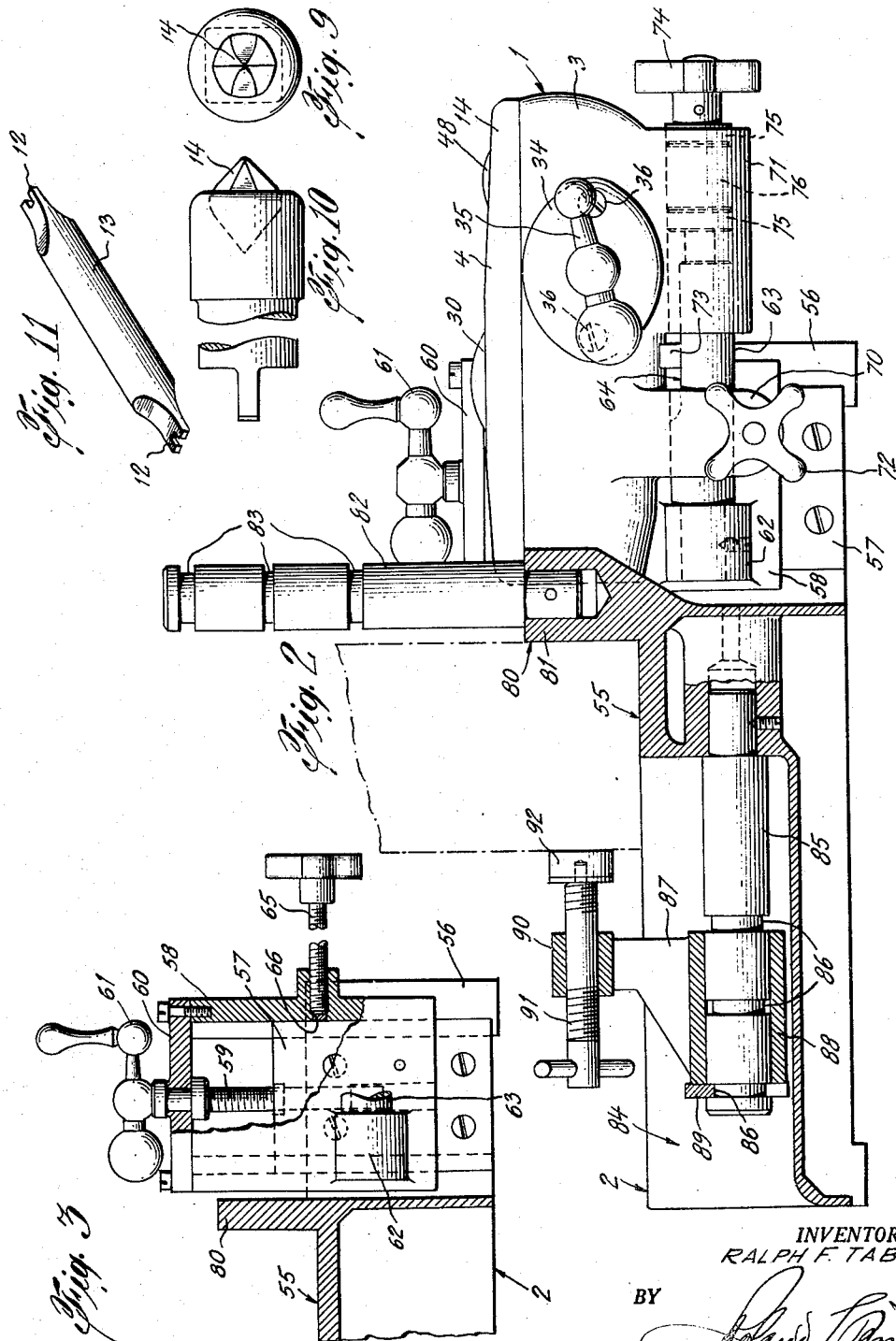

INVENTOR.
RALPH F. TABER
BY
ATTORNEY

Sept. 15, 1959 R. F. TABER 2,903,887
INSTRUMENT FOR TESTING PROPERTIES OF MATERIALS
Filed June 20, 1955 4 Sheets-Sheet 4
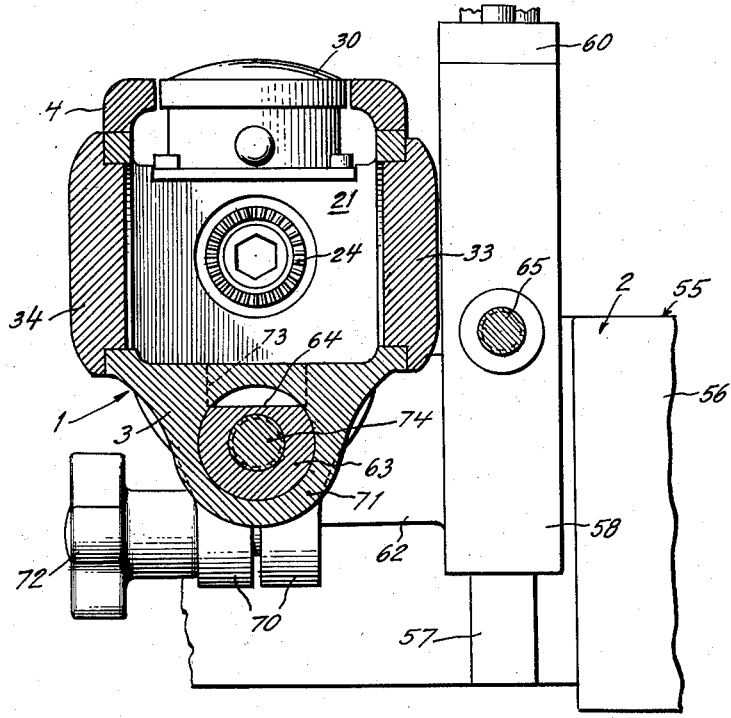
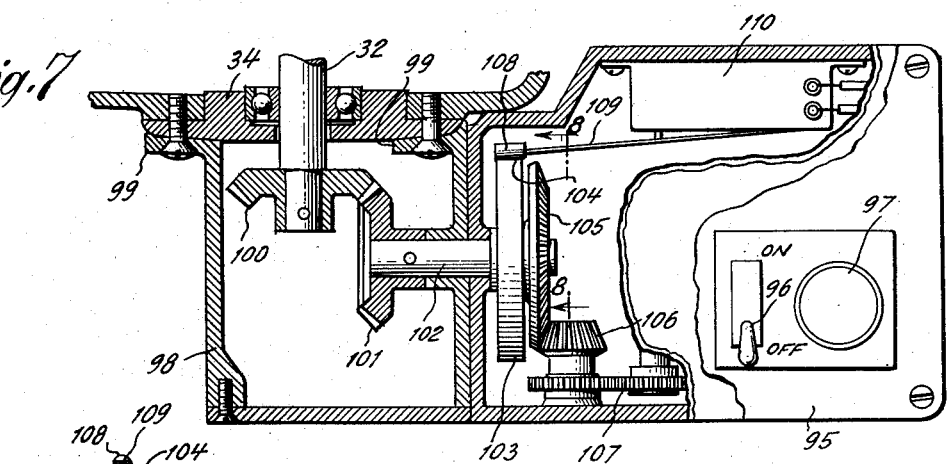
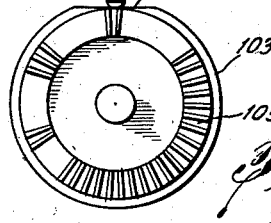
INVENTOR.
RALPH F. TABER
BY
ATTORNEY United States Patent Office 2,903,887
Patented Sept. 15, 1959

2,903,887
INSTRUMENT FOR TESTING PROPERTIES OF MATERIALS

Ralph F. Taber, North Tonawanda, N.Y.

Application June 20, 1955, Serial No. 516,380

12 Claims. (Cl. 73—81)

This invention relates to an instrument for testing the toughness of various materials such as metals, glass, plastics, etc.

The invention provides an instrument for testing a wide variety of materials for digs, scratches, scrapes and other abuse not classified as normal wear. The instrument is used in making tests on many different types of materials, for example, aluminum, steel, glass, carbon, plastic, etc. Coated materials, such as porcelain, may also be tested.

The testing instrument according to the invention, has a casing in which a main shaft is rotatably mounted for sliding movement with resilient means normally operable to project the shaft outwardly relative to the casing. The outer end of the shaft is provided with a penetrator for engaging and operating on a test specimen mounted on a suitable holder which adjustably mounts the casing. Means is provided in the casing for rotating the main shaft alternately in opposite directions, so the rotative movement will cause the penetrator to abrade the test specimen according to the pressure exerted by the resilient means. A penetration indicator is mounted on the casing for operation by suitable means connected with the main shaft. When the casing is properly adjusted with the penetrator engaged with the test specimen, the indicator can be set at the zero position and in subsequent operation, the instrument will have the penetration of the specimen by the penetrator indicated on the graduations on the dial of the indicator. A revolution indicator is also mounted in the casing for registering the number of cycles of operation or rotation of the main shaft. In this way comparative tests on specimens can be made to show relative degrees of toughness, hardness, etc.

The casing of the instrument is constructed to slidably and rotatably mount the main shaft at the outer end while the inner end is provided with a slidable driving connection in a pinion rotatably mounted in a partition in the casing. An indicator actuating arm is rotatably mounted on the main shaft within the casing, but is mounted to move with the shaft only in its axial movement during the testing of a specimen. This indicator actuating arm has a projection for engaging and operating the plunger on the penetration indicator to operate the indicator to register the extent of penetration of a specimen in a test operation.

The invention provides a cam shaft mounted in a casing in transversely extending relation for rotatably supporting a pair of gears intermeshed with a pinion connected to the main shaft, so that a clutch mechanism between the gears having complementary portions on the gears, can be operated to drive one or the other of the gears in alternate relation to provide rotary motion of the main shaft alternately in opposite directions. This clutch construction is formed so that the rotation of the shaft in one direction is greater than that in the other direction so that each successive rotation of the shaft will cause progressive movement of the shaft to constantly change the cutting operation of the penetrator.

The invention further provides for removably mounting the cam shaft on the casing in bearings carried by removable plates. The cam shaft may be operated manually by a handle mounted on one end extending outwardly beyond the casing, or it may be operated by suitable power mechanism mounted on the casing and connected to the cam shaft in place of the handle, for control to automatically operate the shaft so that the main shaft is given a predetermined number of rotative movements in testing a specimen.

The invention provides a testing instrument where the casing is adjustably mounted on a slide member carried by a base. The slide member is adjustable to change the position of the casing with respect to a specimen clamped against the supporting surfaces formed on the base. The casing can also be adjusted on a suitable supporting shaft by complementary means provided on the shaft and the casing. The base is provided with a plurality of posts for detachably and interchangeably mounting a clamping mechanism to make it convenient for mounting test specimens in different positions, so that tests can be conducted on different faces or surfaces of the test specimens.

In the drawings:

Fig. 1 is a plan view of the tester showing a base and the testing unit mounted in operative position thereon;

Fig. 2 is a vertical longitudinal cross section taken substantially on line 2—2 of Fig. 1 showing the testing unit mounted on the base in side elevation;

Fig. 3 is a vertical cross section taken on line 3—3 of Fig. 1 with portions broken away and shown in cross section to illustrate details of construction;

Fig. 6 is a vertical, transverse cross section taken on line 6—6 of Fig. 4;

Fig. 7 is a horizontal cross section through the bearing plate for the projecting end of the cam shaft illustrating the attachment of a motor drive unit thereto, portions of which are broken away and shown in cross section and other portions in elevation;

Fig. 8 is a diagrammatic view illustrating the control cam for the automatic shut-off switch;

Fig. 9 is an end view showing a diamond penetrator;

Fig. 10 is a side elevation of the diamond penetrator shown in Fig. 9; and

Fig. 11 is a perspective showing a carbide penetrator.

Figure 4:
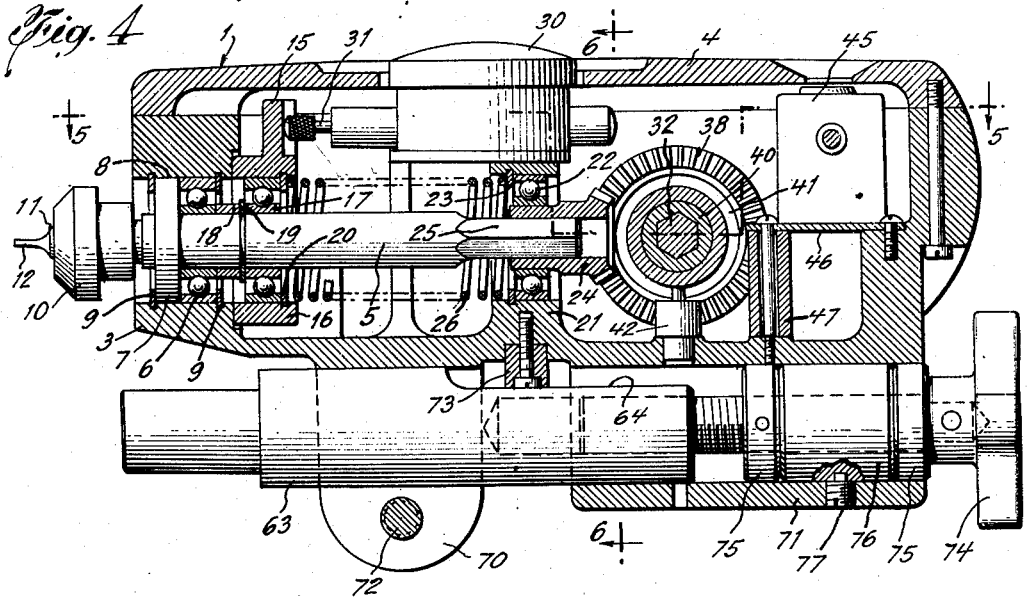
Fig. 4 is an enlarged vertical cross section through the testing unit taken on line 4—4 of Fig. 1.

The testing unit or instrument is indicated at 1 while the supporting base or unit is indicated at 2. The testing instrument has a casing 3 provided with a removable cover 4 secured to the casing in any suitable manner. A main shaft 5 has an outer end slidably and rotatably mounted in a ball bearing assembly 6, as shown in Fig. 4. A conventional form of oil seal 7, Fig. 4, is mounted in the cylindrical opening 8 in the casing on the outer side of ball bearing assembly 6, while retaining rings 9 are detachably engaged in recesses formed in the casing extending outwardly from the inner surface of cylindrical opening 8 for retaining ball bearing assembly 6 and oil seal 7 in assembled position in the casing with main shaft 5 slidably mounted therein and sealed against leakage of lubricant in the casing outwardly through the end.

The outer end of main shaft 5 mounts a conventional form of clamping nut 10 and collet 11, for detachably receiving and retaining the penetrator 12 with shank 13 engaged in the bore of the collet and the recessed end of main shaft 5. This structure provides a means for detachably mounting the penetrator in operative position on the outer end of the main shaft. The penetrator is provided with a diamond cutting element 14 on the outer end, as shown in Figs. 9 and 10, which may be formed in any suitable manner well known in the art to produce an abrading or cutting action on a test specimen with which it is engaged. The penetrator may also be made of carbide in a form such as that illustrated in Fig. 11.

Figure 5:
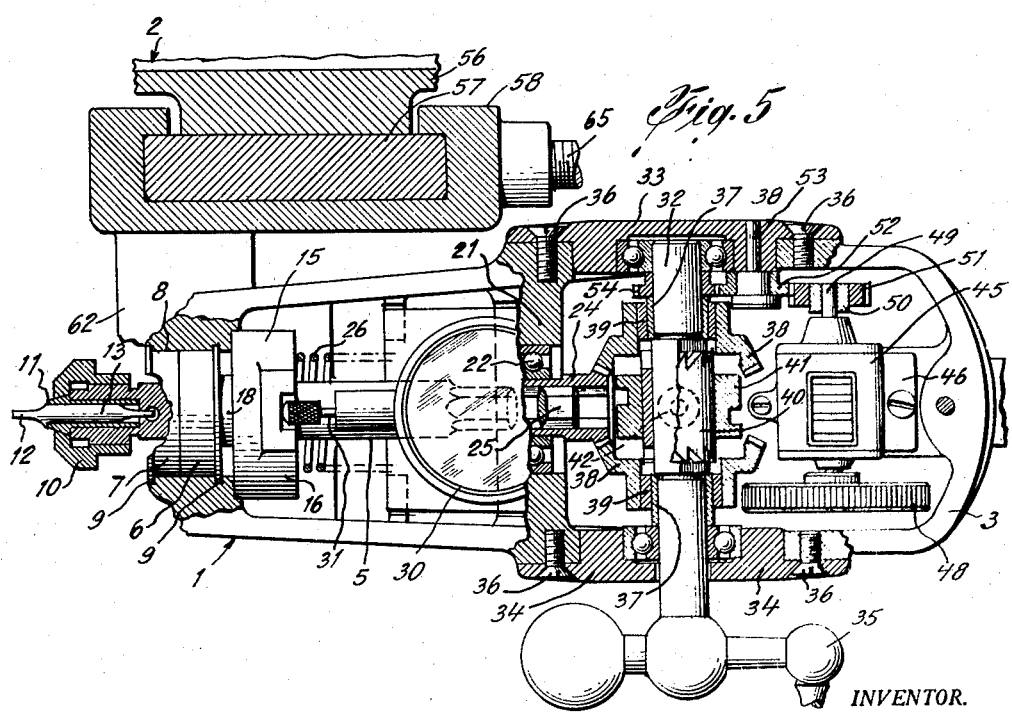
Fig. 5 is a horizontal cross section taken substantially on line 5—5 of Fig. 4 with portions broken away and shown in cross section to illustrate details of construction.

An indicator actuating arm 15 is mounted in casing 3, as shown in Figs. 4 and 5, and has a cylindrical portion 16 extending concentrically about main shaft 5. Arm 15 rotatably receives shaft 5 by means of ball bearing assembly 17. Spacing collar 18 is mounted on shaft 5 between bearing assembly 6 and bearing assembly 17 with a retaining ring 19 engaged in an annular groove in shaft 5 for retaining bearing assembly 17 against endwise movement in one direction relative to main shaft 5. The retaining ring 20 is engaged in an annular groove in cylindrical portion 16 at the opposite side of bearing assembly 17 from retaining ring 19 for cooperation in retaining indicator actuating arm 15 in position to move with main shaft 5 longitudinally relative to casing 3.

The central portion of casing 3 is formed with a transverse partition 21 formed with a cylindrical opening of substantially the same size in axially aligned relation with cylindrical opening 8 in the end of the casing and the opening in cylindrical portion 16 of indicator actuating arm 15. A ball bearing assembly 22 is mounted in the cylindrical opening in partition 21 adjacent retaining ring 23. A pinion 24 is rotatably mounted in bearing assembly 22 and is formed with a hexagonal bore slidably receiving the hexagonal inner end 25 on main shaft 5. This hexagonal construction of the bore of pinion 24 and inner end 25 of main shaft 5 provides a driving connection for transmitting rotary motion from pinion 24 to shaft 5 without interfering in the longitudinal movement of shaft 5 relative to the casing. Suitable resilient means in the form of a coil spring 26 is mounted in concentric relation about main shaft 5 and extends between retaining ring 20 mounted in indicator actuating arm 15 and retaining ring 23 mounted in transverse partition 21. Coil spring 26 is a compression spring constructed to normally move indicator actuating arm 15 and main shaft 5 to project shaft 5 outwardly for engaging the penetrator with a test specimen. The outward movement of main shaft 5 will continue until indicator actuating arm 15 engages the inner end wall of casing 3 adjacent cylindrical opening 8, as shown in Fig. 4.

A penetration indicator 30 of conventional form has a dial formed with a cylindrical scale and a pointer operable to register the longitudinal movement of plunger 31 on the scale. Plunger 31 has the head on the free end engaged with indicator actuating arm 15, as shown in Figs. 4 and 5. Whenever indicator actuating arm 15 is moved to the right, as shown in Fig. 4, it will cause the pointer to rotate over the dial of indicator 30 and thereby register relative longitudinal movement of main shaft 5 to casing 3.

Penetration indicator 30 is detachably mounted on a suitable supporting plate secured to the upper edge of transverse partition 21, as shown in Fig. 4. The opposite marginal portion of the supporting plate is seated upon projections suitably formed on the inner sides of the side walls of casing 3 in a manner which will be apparent from the illustration in Figs. 4 and 5. In this way, penetration indicator 30 is rigidly mounted in the casing with the dial portion engaged in an aperture in cover 4, as shown in Fig. 4, so that the dial portion of the instrument is substantially flush with the surface of cover 4. In this mounting of penetration indicator 30 plunger 31 will be mounted with its axis in spaced parallel relation to the axis of main shaft 5.

A cam shaft 32 has opposite ends rotatably mounted in suitable ball bearings in bearing plates 33 and 34. The bearing plates are mounted in aligned apertures in opposite sides of casing 3 beyond the end of main shaft 5 and pinion 24, as shown in Figs. 4 and 5. One end of cam shaft 32 extends through and outwardly beyond the outer side of bearing plate 34 to detachably mount a handle 35 or a motor drive means, which will be hereinafter described. The other end of shaft 32 terminates within a bearing recess in bearing plate 33. Bearing plates 33 and 34 are formed with flanges at the outer sides of casing 3 engaging seats on the casing for positioning the flanges thereon. These flanges are formed with apertures to receive suitable securing screws 36 for detachably mounting the bearing plates on the casing.

Bearing sleeves 37 are mounted on opposite end portions of cam shaft 32 for rotatably mounting gears 38 at opposite sides of the casing on opposite ends of the cam shaft. Gears 38 have the teeth on the peripheries intermeshed with the teeth on pinion 24 at opposite sides. Gears 38 have clutch collars 39 mounted in the hub portions for rotary movement with the gears on bearing sleeves 37. The inner ends of clutch collars 39 are formed with clutch teeth adapted to cooperate with complementary clutch teeth on clutch sleeve 40. Clutch sleeve 40 has a hexagonal bore slidably engaged on the hexagonal center portion of cam shaft 32 extending between gears 38 and clutch collars 39, as shown in Fig. 5. Clutch sleeve 40 has a length including the complementary teeth on opposite ends thereof slightly less than the distance between the inner ends of the teeth on clutch collars 39.

A clutch operating cam 41 is rigidly mounted on clutch sleeve 40 and has a cam groove formed in the outer periphery thereof which receives a clutch shifting pin 42 mounted in the bottom of the casing, as shown in Fig. 4. In rotation of cam shaft 32 the cam groove in clutch operating cam 41 will provide for shifting movement of clutch sleeve 40 by pin 42 to alternately engage the clutch teeth on one end of sleeve 40 with the complementary clutch teeth on one of the collars 39. Collars 39 and sleeve 40 have an equal number of clutch teeth formed thereon, so arranged that in the shifting operation of clutch sleeve 40 to engage the teeth with one or the other of clutch collars 39, a tooth will be skipped during the shifting operation when the teeth on one collar are disengaged and those on the other are engaged. In this way gears 38 will alternately rotate main shaft 5 through the medium of pinion 24 in opposite directions to a different extent. By providing 20 teeth on clutch collars 39 and sleeve 40, main shaft 5 will be rotated in one direction through an arc of 360°. Through the skipping of one tooth in the shifting of the clutch, main shaft 5 will be rotated approximately 318° in the opposite direction. In this way progressive rotation of main shaft 5 takes place in the operation of the instrument so that in every 20 revolutions for a clutch having 20 teeth, main shaft 5 will be progressively rotated back to the starting point.

A counter 45 of conventional form is mounted on supporting plate 46 detachably secured at one side to a projection on the inner end wall of casing 3, while the opposite end has a screw securing the other end of the plate against a bushing 47 with the screw threaded into the bottom wall of the casing. The dial for indicating the revolutions of the counter is exposed through an aperture in the cover, as shown in Fig. 4. The counter has a resetting wheel 48 at one side thereof with a portion of the periphery projecting through a slot in the cover, as shown in Fig. 1. A counter operating shaft 49 projects from the other side of counter 45 and carries a bushing 50 mounting driven gear 51. Driven gear 51 is positioned adjacent the side wall of casing 3 carrying bearing plate 33 and meshes with counter idler gear 52. Gear 52 is rotatably mounted on the shouldered portion of shoulder pin 53 mounted in bearing plate 33, as shown in Fig. 5. Counter drive gear 54 is fixed to the end of cam shaft 32 adjacent to the bearing for the cam shaft in bearing plate 33. Counter drive gear 54 meshes with counter idler gear 52 and drives the counter to record the number of revolutions of the cam shaft which in turn indicates the number of rotary oscillations of the main drive shaft while conducting a test on a specimen. Reset wheel 48 can be manually operated to reset the counter to the starting position for successive tests.

Supporting base 2 has the top portion formed with a flat supporting surface 55. Base 2 has a projection 56 on one end formed with a vertical face on the inner side detachably mounting slide plate 57. An instrument mounting slide 58 is slidably mounted on slide plate 57 for vertical movement in perpendicular relation to supporting surface 55. A slide adjusting screw 59 has a threaded mounting in slide plate 57 and has rotatable bearing engagement in slide cover 60 detachably mounted on the upper end of instrument mounting slide 58. A hand crank 61 is mounted on the upper end of adjusting screw 59 for convenient manual operation in adjusting slide 58 on slide plate 57 to change the position of slide 58 relative to the base. Instrument mounting slide 58 is formed with a projection 62 rigidly mounting the reduced end of instrument mounting shaft 63.

Instrument supporting shaft 63 has its axis mounted in parallel relation to supporting surface 55 and projects outwardly away from one end of the base, as clearly shown in Fig. 2. Shaft 63 has a flat upper face portion 64 extending from near projection 62 to the free end. A clamping screw 65 having a handle on the outer end has the inner end threaded in one side of instrument mounting slide 58, as shown in Fig. 3, for engagement with a clamping disc 66. When clamping screw 65 is turned to move the inner end into the slide it will engage clamping disc 66 and force it against the edge of slide plate 57 for rigidly locking instrument mounting slide 58 in adjusted position against movement. This operation of clamping screw 65 takes up all of the clearance between instrument mounting slide 58 and slide plate 57 in order to firmly and rigidly support instrument supporting shaft 63 in rigid adjusted position and in parallel relation to supporting surface 55.

Instrument supporting shaft 63 slidably supports testing instrument 1. Casing 3 has the bottom portion formed with a bifurcated projection 70 and a guiding projection 71. Projections 70 and 71 are formed with aligned bores for slidably receiving instrument supporting shaft 63. An instrument clamping screw 72 extends through a transversely extending aperture in one of the bifurcations of projection 70 and is threaded in the other. A handle on the outer end of clamping screw 72 provides a shoulder for engaging the outer face of projection 70. By turning screw 72 in one direction the bifurcations are drawn together to rigidly clamp instrument 1 in adjusted position against movement on shaft 63. A key 73 is rigidly mounted in a transverse groove in the bottom outer portion of casing 3 between projections 70 and 71. Key 73 is positioned to have its lower face slidably engage flat upper face portion 64 on supporting shaft 63 to accurately position and guide instrument 1 on shaft 63 to maintain the instrument with its main shaft 5 in parallel relation to supporting surface 55 on base 2.

An instrument adjusting screw 74 has a handle on the outer free end, while the inner end extends coaxially in the bore of guiding projection 71. The inner end of instrument adjusting screw 74 is threadedly engaged in a threaded bore extending axially in the outer end of supporting shaft 63, as shown in Fig. 6 and by dotted lines in Fig. 4. A pair of thrust collars 75 are rigidly attached in spaced relation on instrument adjusting screw 74 in the bore in guiding projection 71, as shown in Fig. 4, on opposite sides of sleeve bearing 76. Sleeve bearing 76 is mounted in the outer end portion of the bore in guiding projection 71 and rigidly retained against movement in the bore by means of set screw 77, as shown in Fig. 4.

In rotation of instrument adjusting screw 74 in one direction, instrument 1 will be slidably moved on shaft 63 toward base 2. Clamping screw 72 should first be operated to release bifurcated projection 70 so the instrument is freely slidable on the shaft. When adjusting screw 74 is operated in the other direction instrument 1 will be moved away from the base. Whenever the instrument is in the desired position of adjustment, operation of clamping screw 72 will rigidly lock the instrument in adjusted position preparatory for a test operation.

Base 2 has a pair of spaced, aligned, upwardly extending flanges 80 on the side formed with projection 56 adjacent to the mounting of instrument 1. The space between the projections, as shown in Fig. 1, is arranged to be in alignment with instrument 1 so that the outer end of main shaft 5 with the penetrator can project between the flanges in testing a specimen. Flanges 80 are formed with coplanar vertical faces extending in perpendicular relation to the axis of main shaft 5 of instrument 1. These vertical faces of flanges 80 are used in cooperation with supporting surface 55 in mounting and accurately locating a test specimen on the base in a desired position for testing. One of the flanges 80, at the lower part of the base, as illustrated in Fig. 1, is formed with a projection 81 formed with a vertically extending cylindrical recess receiving the reduced end of a clamping post 82, see Fig. 2. The upper portion of clamping post 82 is formed with a plurality of spaced annular grooves 83 formed to receive a retaining washer for a specimen clamp that will be hereinafter described.

The central portion of base 2 in alignment with instrument 1, as shown in Fig. 1, is formed with a recess 84 to receive a clamping post 85. Clamping post 85 is formed with a plurality of annular grooves 86 and its construction is a duplicate of clamping post 82. One end of clamping post 85 is formed with a reduced cylindrical portion engaged in a cylindrical bore formed in base 2, as shown in Fig. 2. Clamping post 85 is mounted with its axis in horizontal relation and in spaced parallel relation to supporting surface 55 of base 2. Clamping post 85 is also arranged in substantially the same vertical plane as the axis of instrument supporting shaft 63, as will be clear from Fig. 1.

A specimen retaining clamp has a clamping arm 87 formed with a cylindrical portion 88 having a bore therethrough for slidably engaging on either clamping post 82, or clamping post 85, according to the position in which a specimen is to be clamped in engagement with supporting surface 55 and the vertical surface of flanges 80. Clamping arm 87 is retained in position on either post 82 or post 85 by means of a retaining washer 89 that may preferably be of C-shape. The retaining washer 89 engages in one of the grooves 83 or 86 in retaining clamping arm 87 on one of the clamping posts.

The other end of clamping arm 87 is formed with a head 90 provided with a threaded bore in spaced parallel relation to the axis of the bore in cylindrical portion 88 and the axis of the clamping post on which it is mounted. A specimen clamping screw 91 is threaded in the threaded bore in head 90. Specimen clamping screw 91 has a handle on one end and a specimen engaging pad 92 on the opposite end.

Specimens for testing may have two flat sides and be of cylindrical shape, such as grinding wheels, or they may be square, rectangular, or of some polygonal shape. Some specimens may be of sheet material, such as glass, vitreous coated materials, and just plain sheet metals, boards and so forth. In testing a specimen of any shape, it will be placed on supporting surface 55 of base 2 with another portion engaged with the vertical face of flanges 80. Depending upon the shape of the test specimen clamping arm 87 will be mounted either on vertical clamping port 82, or horizontal clamping post 85, and the clamping screw operated to firmly clamp the specimen in position in engagement with the vertical surface of flanges 80, or supporting surface 55.

While the specimen is being clamped in position on base 2, testing instrument 1 will have been moved on instrument supporting shaft 63 outwardly so the end of penetrator 12 will be located in spaced relation from the specimen. The specimen is located against flanges 80 so that the portion to be tested will extend across the space between the flanges. Then, with clamping screws 65 and 72 operated into the released position, hand crank 61 can be rotated to adjust instrument mounting slide 58 vertically to bring penetrator 12 into a position to engage the desired part of the surface of the test specimen. Instrument adjusting screw 74 can then be operated to adjust the instrument on instrument supporting shaft 63 to engage the penetrator with the surface of the test specimen. Slide clamping screw 65 is turned into slide locking position before the instrument has the penetraor engaged with the specimen.

When the instrument is moved by the operation of adjusting screw 74 to engage the penetrator with the specimen it will be so operated that main shaft 5 of the instrument will have the casing moved longitudinally to place the coil spring 26 under tension and move indicator actuating arm 15 with cylindrical portion 16 away from engagement with the end wall of the casing to an extent that the pointer on penetration indicator 30 will be rotated one or two revolutions and set with the pointer at the zero position on the scale. Then, instrument clamping screw 72 is operated to rigidly lock the instrument on supporting shaft 63.

The instrument is then set in position to start the test. It will be understood that reset wheel 48 has been operated to set counter 45 in the zero position. Then, by rotating handle 35 cam shaft 32 will rotate clutch sleeve 40. This operation will cause the clutch sleeve to alternately move in opposite directions on cam shaft 32 and alternately engage and rotate one of the collars 38 with and in the same direction as the cam shaft. By having the teeth on pinion 24 at opposite sides thereof the pinion will be alternately rotated in opposite directions. This provides oscillating movement of main shaft 5. Through the tension of coil spring 26 the penetrator is projected toward the specimen so that in each oscillation of the shaft the operative free end of the penetrator will abrade the surface of the specimen.

By rotating handle 35 to register a given number of rotations or oscillations on counter 45 a test of a given character can be performed on each successive specimen. Then, by reading the position of the pointer on the scale of penetration indicator 30 the reading will indicate the extent of penetration of the penetrator into the material of the specimen and in this way indicate the relative toughness or resistance of the material to abrasion and cutting. The relative toughness, hardness, and resistance to digs, scrapes, cutting, or abrasion, can be obtained for various types of materials for comparison to show the differences in character of different kinds of materials such as glass, plastics, metals and various other types of materials.

The invention provides means for more uniformly operating the instrument than may be possible with manual operation of the cam shaft by rotating handle 35. An electric motor drive may be provided for power operation of the instrument to obtain uniform operation of main shaft 5 at a uniform speed in performing each test. A motor drive unit of suitable type is shown in Fig. 7. An electric motor unit 95 of conventional form, is provided with a switch 96 and push button 97. The starting switch and push button may be of any desired conventional form, well known in the art, for controlling the operation of the motor. When the operator of the instrument pushes push button 97 it will close an electric circuit to operate the motor so that main shaft 5 of the instrument can be operated to the desired extent by running the motor until counter 45 registers the desired number of rotations, or until a desired degree of penetration of the specimen is obtained.

The mounting of motor 95 on instrument casing 3 is diagrammatically illustrated in Fig. 7, in which one end of the motor is suitably secured to one end of a gear housing 98. The gear housing has an open side provided with securing flanges 99 formed to engage the outer marginal portion of bearing plate 34. Securing screws similar to those used for securing bearing plate 34 may be used to secure gear housing 98 and bearing plate 34 to casing 3. A bevel gear 100 is mounted on the reduced end of cam shaft 32 in place of handle 35. Driving gear 101 meshes with gear 100 and is mounted on one end of a drive shaft 102 rotatably mounted in bearings in gear case 98 and electric motor unit 95. Motor unit 95 will include a suitable speed reduction gear mechanism, not shown, of a character well known in the art which will have connection with drive shaft 102 to rotate it at the desired speed for obtaining the operation of cam shaft 32 and main shaft 5 at a speed of the character desired in carrying out a test operation.

Motor unit 95, in addition to including a suitable reduction gear of conventional form, may also include a suitable type of conventional motor control for stopping the motor after a given number of revolutions of either the motor shaft, or of drive shaft 102. For example, this control mechanism may include a control disc 103 having a cam face 104 at one point on its periphery. Control disc 103 is rotatably mounted independently and in concentric relation to shaft 102 in the end of the motor housing connected to gear case 98. Control disc 103 may be provided with a bevel gear 105 having an idler pinion 106 intermeshed therewith. Pinion 106 may have a gear integral therewith meshing with a driving gear 107. The driving gear 107 will be operated in a suitable manner from the drive in the conventional gear reduction unit with the sizes of the idler gear and pinion proportioned so that control disc 103 will be moved through one revolution from the starting of a test operation until a predetermined number of revolutions of main shaft 5 have been made for a given test operation. Control disc 103 has its periphery engaging roller 108 on spring-pressed switch arm 109 of switch 110 connected into the motor circuit for control by switch 96.

By employing the electric motor unit 95 for driving the instrument the desired number of operations can be obtained by operating push button 97 manually until the counter 45 registers the desired number, or switch 96 can be operated to the "On" position to include switch 110 in the motor circuit in addition to push button 97. Then, the motor may be started by operating push button 97 to start the motor and maintain its operation a sufficient length of time to provide for cam face 104 moving out of contact with roller 108. This will move switch arm 109 to close the circuit to the motor through switch 110 and maintain the motor automatically in operation until control disc 103 completes one revolution. As control disc 103 completes one revolution cam face 104 will again engage roller 108 and allow operation of switch arm 109 to open the switch 110 and stop the motor.

The invention provides a testing instrument in which instrument 1 in combination with base 2 provides for the rigid mounting of a test specimen with a portion of one face positioned to have the penetrator of the instrument engage therewith at the desired angle to test the material of the specimen for its properties to resist penetration. This resistance of various materials to penetration by the instrument is a test to show the properties of the material tested to resist abrasion, scuffing and various types of impacts and blows from other objects that normally cause damage to an object or material from its everyday use. For example, this instrument will produce test results that will simulate everyday scrapes, scuffs and knocks to which many different types of household equipment and furniture are subjected in their normal use; to which many types of office furniture, office machines and other equipment used in offices are subjected in daily use; to which other types of machines and equipment used in factories are subjected in daily use; and to which various types of outdoor vehicles are subjected in use.

The invention claimed is:

1. An instrument for testing the properties of materials comprising a casing, a main shaft extending longitudinally in said casing with one end projecting outwardly from one end thereof, means detachably mounting a penetrator on said one end of said main shaft, bearing means rotatably supporting said shaft for limited axial movement relative to the casing, an indicator mounted on said casing having an operating arm movable longitudinally in parallel relation to said main shaft, an indicator actuator, means for mounting said actuator on said main shaft for longitudinal movement therewith, said mounting means including a bearing between the shaft and actuator, resilient means engaged between said casing and indicator actuator normally moving said actuator and main shaft outwardly relative to said casing, said indicator actuator having a portion engaging and operating said operating arm and indicator to register movement of said shaft relative to said casing, driving means mounted on said casing for rotating said main shaft, a rotation counter mounted on said casing connected with said main shaft for registering the number of rotations of said main shaft, and means adjustably mounting said casing relative to a test specimen with said penetrator engaged with said specimen, whereby said indicator will register the amount of penetration of said penetrator into said specimen for a given number of rotations of said main shaft registered on said rotation counter.

2. An instrument for testing the properties of materials comprising a casing, a main shaft rotatably mounted in said casing for relative axial movement having one end projecting beyond one end of said casing, a penetrator mounted on the projecting end of said shaft, an indicator actuator mounted on said main shaft for longitudinal movement in said casing with said shaft, resilient means engaged with said casing and indicator actuator normally moving said shaft axially outward relative to said casing, an indicator on said casing having a part engaged and operated by said indicator actuator to register relative movement of said shaft to said casing, driving means mounted on said casing connected to and operable to rotate said shaft, a rotation counter on said casing connected to said shaft to register the number of rotations thereof, and means mounting a test specimen and said casing in adjustable relation to each other, whereby said penetrator is engaged with the test specimen while said indicator registers the amount of penetration of said penetrator into the test specimen for a given number of rotative movements of said shaft registered by said rotation counter.

3. An instrument for testing the properties of materials of the character claimed in claim 2, in which the driving means comprises a driving element rotating in one direction, driven parts connected for driving said main shaft, and slidable means on said driving element alternately engageable with selected driven parts for alternately reversing the rotation of the main shaft and said slidable means and driven parts being formed for producing a greater extent of rotative movement in one direction than in the other.

4. An instrument for testing the properties of materials of the character claimed in claim 2 comprising a cam shaft rotatably mounted in said casing, intermeshing gears mounted on said cam and main shafts, clutch means mounted on said cam shaft alternately engageable with selected of said intermeshing gears to drive said main shaft selectively in opposite directions, said driving means on said casing being connected with said cam shaft, and actuating means engaging and automatically operating said clutch means to alternately drive said main shaft in opposite directions.

5. An instrument for testing the properties of materials comprising a casing, a main shaft extending longitudinally in the casing with one end projecting beyond one end of the casing, a penetrator mounted on the projecting end of said shaft, bearings slidably and rotatably mounting the projecting end of said shaft in the end of said casing, a pinion rotatably mounted in said casing at the inner of said shaft, formed to slidably receive the inner end of said shaft and for transmitting motion thereto, an indicator actuating arm rotatably receiving said shaft and mounted on said shaft for axial movement therewith, a compression spring engaged between said actuating arm and a portion of said casing for biasing said main shaft outwardly relative to said casing, a penetration indicator mounted on said casing and operated by said actuating arm for indicating relative movement of said shaft to said casing, a cam shaft rotatably mounted in said casing in transversely extending relation to said main shaft adjacent said pinion, a pair of gears rotatable on said cam shaft in mesh with said pinion, a clutch sleeve slidably mounted on and rotated by said cam shaft, said sleeve being located between said gears, said sleeve and gears having complementary clutch means alternately engageable upon sliding movement of said sleeve toward one or the other of said gears to alternately rotate said main shaft in opposite directions, means on said casing engaging said sleeve operable to slide said sleeve back and forth on said cam shaft in the rotation thereof to alternately engage said clutch means, said cam shaft having one end projecting to the outside of said casing, operating means at the outside of said casing for rotating said cam shaft, and means adjustably mounting said casing relative to a test specimen whereby said casing may be set with said penetrator engaged with said specimen with said main shaft and indicator in a predetermined position to measure the extent of penetration into said specimen after a given amount of operation of said main shaft by said operating means.

6. An instrument for testing the properties of materials comprising a casing, a main shaft rotatably mounted in said casing for relative axial movement having one end projecting beyond one end of the casing, a penetrator mounted on the projecting end of said shaft, an indicator mounted on said casing and connected to said main shaft for operation to indicate movement of said shaft relative to said casing, means in said casing engaged with and normally biasing said shaft outwardly from said one end of said casing, a pinion rotatably mounted in said casing slidably receiving the inner end of said main shaft and formed to transmit rotary motion to said shaft, a cam shaft rotatably mounted in said casing in transversely extending relation to said main shaft adjacent to said pinion, a pair of gears rotatable on said cam shaft at opposite sides of said pinion in intermeshed relation therewith, a clutch sleeve slidably mounted on said cam shaft between said gears for transmitting rotary motion from said cam shaft to said gears alternatively, said gears and opposed ends of said clutch sleeve having complementary clutch means formed thereon alternately engageable to rotate one or the other of said gears, complementary means on said casing and clutch sleeve automatically shifting said sleeve back and forth during rotation of said cam shaft to alternately rotate one of said gears for alternately rotating said main shaft in opposite directions, operating means at the outside of said casing for rotating said cam shaft, and means for adjustably mounting a specimen relative to said casing, whereby said casing and specimen may be mounted to engage said penetrator with said specimen with said main shaft moved to set said indicator at a predetermined position for indicating the amount of penetration of said specimen after said main shaft has been given a predetermined number of rotations.

7. An instrument for testing the properties of materials as claimed in claim 6, wherein said operating means is a motor mounted on said casing having a drive connection with said cam shaft for power operation of said main shaft.

8. An instrument for testing the properties of materials as claimed in claim 6, wherein a pair of removable plates on said casing provide mounts for said cam shaft with an end extending outwardly from said casing, and a power drive is mounted on one of said plates and is connected with the projecting end of said cam shaft for rotating said cam and main shafts.

9. An instrument for testing the properties of materials, comprising a base having a specimen supporting surface, means for detachably mounting a test specimen on said surface of said base, a slide member adjustable on said base in perpendicular relation to said surface, a casing supporting shaft mounted on said slide member having a flat face parallel to said surface of said base, a casing having a portion slidably mounted on said shaft with a part slidably engaging said flat face for holding said casing in a fixed relation to said base, means for adjusting said casing on said shaft, a main shaft rotatably mounted in said casing for relative axial movement having one end projecting beyond one end of the casing toward said base, a penetrator mounted on the projecting end of said shaft with the free end positioned to engage a test specimen on said surface, means in said casing normally projecting said shaft outwardly from said casing to move said penetrator toward said specimen, an indicator on said casing operated by said shaft to indicate movement of said shaft and penetrator toward said specimen and relative to said casing, and operating means for rotating said shaft, whereby said indicator will register the amount said penetrator cuts into said specimen on said base when said shaft is rotated a predetermined amount.

10. An instrument for testing the properties of materials of the character set forth in claim 9, wherein manually operable means is attached to said casing and casing supporting shaft for adjusting the casing on said casing supporting shaft for setting said casing and penetrator in a desired position relative to a test specimen on said surface of said base to start a test, and clamping means for firmly clamping said casing in adjusted position.

11. An instrument for testing the properties of materials of the character set forth in claim 9, wherein said base has a pair of posts mounted thereon, one of said posts extending in parallel relation to said surface of said base and the other post extending in perpendicular relation to said surface, said means for detachably mounting a test specimen formed for detachable mounting on either of said posts for cooperation therewith in holding a test specimen and manually operable means attached to said casing and casing supporting shaft for setting said casing and penetrator in a desired position relative to a test specimen clamped on said surface.

12. An instrument for testing the properties of materials comprising a casing, a main shaft rotatably mounted in said casing for relative axial movement having one end projecting beyond one end of said casing, a penetrator mounted on the projecting end of said shaft, an indicator actuator mounted on said main shaft for longitudinal movement in said casing with said shaft, resilient means engaged with said casing and indicator actuator normally moving said shaft axially outward relative to said casing, an indicator on said casing having a part engaged and operated by said indicator actuator to register relative movement of said shaft to said casing, driving means mounted on said casing connected to and operable to rotate said shaft, a rotation counter on said casing connected to said shaft to register the number of rotations thereof, a base formed with a specimen supporting surface, a post mounted on said base in outwardly extending relation, a specimen clamp mounted on said post for detachably clamping a test specimen against said surface, a casing supporting shaft in parallel relation to said surface, means mounting said casing supporting shaft on said base having parts operable to adjust the position of said shaft to said surface, and means adjustably mounting said casing on said casing supporting shaft, whereby said casing supporting shaft and casing may be adjusted to engage the penetrator with a test specimen on said surface with said indicator in a predetermined position for starting a test operation on the specimen and said indicator registers the amount of penetration of said penetrator into the test specimen for a given number of rotative movements of said shaft registered by said rotation counter.

References Cited in the file of this patent

UNITED STATES PATENTS

| 2,126,175 | Dalcher | Aug. 9, 1938 |
| 2,338,537 | Podesta | Jan. 4, 1944 |

FOREIGN PATENTS

| 413,471 | Germany | May 11, 1925 |